US010573289B2

(12) United States Patent
Przybyla et al.

(10) Patent No.: US 10,573,289 B2
(45) Date of Patent: Feb. 25, 2020

(54) PACKAGE WAVEGUIDE FOR ACOUSTIC SENSOR WITH ELECTRONIC DELAY COMPENSATION

(71) Applicant: Chirp Microsystems, Inc., Berkeley, CA (US)

(72) Inventors: Richard Przybyla, Emeryville, CA (US); Andre Guedes, San Francisco, CA (US); Stefon Shelton, Oakland, CA (US); Meng-Hsiung Kiang, Berkeley, CA (US); David Horsley, Berkeley, CA (US)

(73) Assignee: CHIRP MICROSYSTEMS, INC., Berkeley, CA (US)

( * ) Notice: Subject to any disclaimer, the term of this patent is extended or adjusted under 35 U.S.C. 154(b) by 359 days.

(21) Appl. No.: 15/583,861

(22) Filed: May 1, 2017

(65) Prior Publication Data

US 2017/0236506 A1    Aug. 17, 2017

Related U.S. Application Data

(63) Continuation of application No. PCT/US2015/059595, filed on Nov. 6, 2015.
(Continued)

(51) Int. Cl.
*G10K 11/00* (2006.01)
*G10K 11/34* (2006.01)
(Continued)

(52) U.S. Cl.
CPC .......... *G10K 11/002* (2013.01); *G01S 7/521* (2013.01); *G01S 15/10* (2013.01); *G10K 11/346* (2013.01)

(58) Field of Classification Search
CPC .... G10K 11/002; G10K 11/346; G01S 15/10; G01S 7/521; H04R 29/002; H04R 17/00;
(Continued)

(56) References Cited

U.S. PATENT DOCUMENTS 4,468,680 A  *  8/1984  Martner ............... B41J 2/055
                                                         310/328
6,299,272 B1 * 10/2001  Baker ................. B41J 2/04541
                                                         347/10
(Continued)

FOREIGN PATENT DOCUMENTS

WO    WO-2016073936 A2 *  5/2016  ............. H04R 17/00
WO    WO-2016073936 A3 *  8/2016  ............. H04R 17/00

OTHER PUBLICATIONS

International Search Report & Written Opinion dated Mar. 7, 2016 for International Application No. PCT/US15/59595.

*Primary Examiner* — Daniel Pihulic
(74) *Attorney, Agent, or Firm* — JDI Patent; Joshua D. Isenberg; Robert Pullman

(57) ABSTRACT

A system and method use an array of ultrasonic transducers to emit and receive sound in a phased array fashion by using acoustic waveguides to achieve a desired acoustic radiation and reception pattern. A chip package attached to an acoustic transducer array includes acoustic waveguides coupled to acoustic ports. Each waveguide is coupled between a corresponding acoustic transducer and a corresponding acoustic port. A spacing of a pair of acoustic ports is different than a spacing of a corresponding pair of acoustic transducers.

26 Claims, 4 Drawing Sheets

Related U.S. Application Data

(60) Provisional application No. 62/077,149, filed on Nov. 7, 2014.

(51) Int. Cl.
*G01S 15/10* (2006.01)
*G01S 7/521* (2006.01)

(58) Field of Classification Search
CPC .............. H04R 29/005; H04R 2217/03; H04R 2201/003; H04R 3/04
See application file for complete search history.

(56) References Cited

U.S. PATENT DOCUMENTS

| | | | |
|---|---|---|---|
| 6,562,650 B2 * | 5/2003 | Ladabaum | B06B 1/0292 310/334 |
| 7,795,784 B2 | 9/2010 | Davidsen et al. | |
| 2017/0236506 A1 * | 8/2017 | Przybyla | H04R 17/00 367/103 |

* cited by examiner

FIG. 1 – PRIOR ART

PACKAGE WAVEGUIDE FOR ACOUSTIC SENSOR WITH ELECTRONIC DELAY COMPENSATION

CLAIM OF PRIORITY

This application is a continuation of International Patent Application Number PCT/US2015/059595, filed Nov. 6, 2015, the entire contents of which are incorporated herein by reference for all purposes. International Patent Application Number PCT/US2015/059595 claims the priority benefit of U.S. Provisional Patent Application No. 62/077,149, filed Nov. 7, 2014, the entire contents of which are incorporated herein by reference for all purposes.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

Time-of-flight (TOF) sonic rangefinders emit a signal composed of sound waves and measure the signal that is reflected off objects in the environment in order to measure the presence, range and/or direction to said objects. The range is determined by measuring the time of flight of the sound wave. Short duration pulses or temporally coded pulses allow the system to resolve multiple targets that are spaced in range. Phased array rangefinders incorporate multiple transmitters and/or receivers which are spatially separated in order to discern the direction (azimuth and/or elevation) to the objects.

Typical acoustic transducer designs are membrane structures which are driven into flexural vibration using piezoelectric or capacitive actuation. The vibration of the membrane creates air motion which propagates as sound away from the transducer. Returning sound waves cause the transducer to vibrate and this motion is sensed by an electronic amplifier through piezoelectric or capacitive sensing techniques. Multiple transducers are fabricated on a single substrate using wafer fabrication techniques.

By way of example, consider FIG. 1, which illustrates the prior art. An acoustic transducer array substrate 28 contains acoustic transducers 22 and 24 which are coupled through acoustic ports 25 and 26. Transducer designs may be released using a through-wafer etch which forms a trench beneath the transducer. The trench may be designed to be an acoustic resonator which has a length of approximately one quarter of a wavelength, as described in S. Shelton, O. Rozen, A. Guedes, R. Przybyla, B. Boser, and D. A. Horsley, "Improved acoustic coupling of air-coupled micromachined ultrasonic transducers," 27th IEEE International Conference on Micro Electro Mechanical Systems (MEMS 2014), pp. 753-756, San Francisco, Calif. 2014, incorporated by reference herein in its entirety. In this way the trench serves as an acoustic waveguide. Proper design enables the transducer to have increased sensitivity and reduced mechanical response time.

In FIG. 1, the phased array acoustic transducers 22, 24 are spatially separated in order to minimize the beamwidth of the acoustic signal when the array is used as a phased array transmitter and/or receiver. The spacing is a tradeoff between beamwidth and sidelobe level. When the spacing is increased, the beamwidth is reduced, but the sidelobe level increases. In practice the array elements are preferentially spaced between one half wavelength and one wavelength apart. It is often desirable that each element in the array have a substantially isotropic acoustic radiation pattern such that the array can be electronically steered over a wide range of angles. In order to create an isotropic vibrating membrane transducer, the transducers 22, 24 must be designed to be smaller than the wavelength A of the sound wave. When the diameter of each transducer is smaller than the required spacing, there can be considerable unused area between each transducer, which increases the cost and size of the transducer array chip. A new method is required to reduce the considerable inactive space on a transducer substrate.

U.S. Pat. No. 8,199,953, describes a method to connect multiple acoustic waveguides together above a single acoustic transducer, thereby producing an acoustic horn with multiple apertures. As described in that patent, the intent of this multi-aperture horn is to take a single omnidirectional transducer and shape the acoustic output so that the single transducer produces a directional acoustic output. However, U.S. Pat. No. 8,199,953 does not teach how to use acoustic waveguides in a phased array, nor does it teach how to use an array of waveguides together with an array of transducers.

Therefore, a new method to design and operate phased array rangefinders is required to address these shortcomings in the state of the art.

SUMMARY OF THE INVENTION

This disclosure describes a system and a method to use an array of ultrasonic transducers to emit and receive sound in a phased array fashion by using acoustic waveguides and electronic delays to achieve a desired acoustic radiation and reception pattern. By appropriate design of the acoustic waveguide array, the size of the transducer array can be greatly reduced while maintaining a desired acoustic beam pattern, significantly reducing manufacturing costs.

DETAILED DESCRIPTION OF THE INVENTION

A system to package an array of acoustic transducers is disclosed. The present disclosure describes how to package an array of transducers to increase the effective spacing between the transducers in order to improve the imaging properties of the array.

Figure 1:
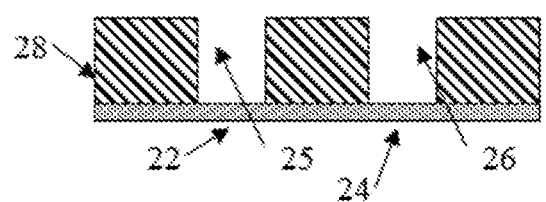
FIG. 1 shows a schematic side view of an acoustic transducer representing the PRIOR ART.
Figure 2:
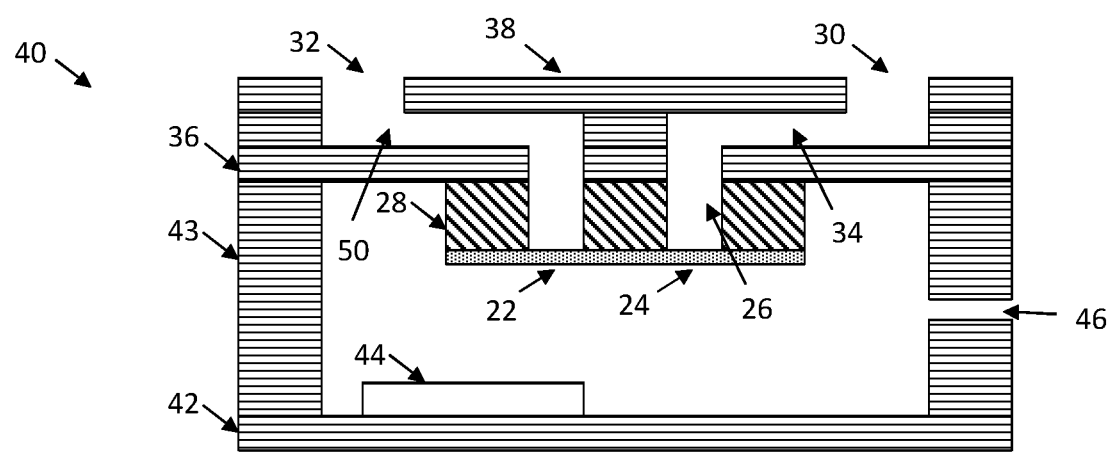
FIG. 2 shows a schematic side view of an acoustic transducer package.

Referring to FIG. 2, a transducer array substrate 28 contains acoustic transducers 22 and 24 which are coupled through transducer acoustic ports 25, 26. The substrate 28 may be made of silicon, glass, plastic, or many other materials. The acoustic transducers 22, 24 may be made using a piezoelectric unimorph or multimorph structure with various piezoelectric materials including AlN, PZT (lead zirconate titanate), ZnO, KNN ($K_xNa_{1-x}NbO_3$) or PMN-PT (lead magnesium niobate-lead titanate). They may also be actuated capacitively. The acoustic ports 25 and 26 may be formed, e.g., using a deep reactive ion etch or by other means.

In this embodiment, the transducer array substrate 28 is mounted to a chip package 40 which contains acoustic waveguides 34, 50 leading to acoustic ports 32, 30. Acoustic waveguides 34, 50 and transducer acoustic ports 25, 26 may be filled with a gas when the acoustic transducer is used to measure or emit sound signals in that gas. Acoustic waveguides 34, 50 and transducer acoustic ports 25, 26 may be filled with epoxy, liquid, gel, silicone, or other material with desirable acoustic impedance when the acoustic transducer is used to measure and/or emit sound signals in a fluid such as water or tissue such as a human body. Many different materials may be used to make chip package 40; example materials include plastic, glass-reinforced epoxy laminate, ceramic, glass and/or metal or a combination of these materials. While the figures show only two acoustic ports 30,32 and two transducers 22, 24, this is for purposes of illustration only and it should be understood that many embodiments will have a multiplicity of ports and transducers.

Chip package 40 may contain electrical signal routing and bond pads in order to make electrical connection to transducer array 28. The chip package 40 may contain an electronic integrated circuit 44 which interfaces to transducer array 28 through electronic signal routing on the chip package 40. Alternatively, integrated circuit 44 may interface to transducer array 28 directly through wire bonds, bump bonds, ball-grid arrays, and/or through-silicon vias. Chip package 40 may contain a port 46 which permits equalization of the pressure on each side of acoustic transducers 22, 24.

Chip package 40 may also be understood to be assembled in several pieces. These pieces may include a base layer 42, an intermediate layer 43, and an array-mounting layer 36 and a surface layer 38. The transducer array substrate 28 is attached to the array-mounting layer 36, which is attached to the intermediate layer 43. The intermediate layer 43 includes an opening large enough to receive the transducer array substrate 28. The intermediate layer 43 is attached to the base layer 42. By way of example, chip package component layers 36, 38, 42, and 43, and acoustic waveguides 34, 50 may be designed to be part of an external enclosure of a system which contains the acoustic transducer array. The external enclosure surface may be made of many different materials including glass, metal, plastic, or laminate material. In some implementations, surface layer 38 may be coated with an anti-scratch coating for durability.

In order to realize the desired beamwidth of the transmit and receive beam pattern, the acoustic ports 30, 32 in chip package 40 are spaced with a pitch that is less than 5λ and more specifically with a pitch between ½λ and λ where λ is the acoustic wavelength. Because the arrangements of ports 30, 32 determine the acoustic beam profile, the spacing of transducers 22 and 24 on array substrate 28 can be defined according to manufacturing requirements and may be either smaller or larger than the spacing of ports 30, 32 in chip package 40. Acoustic ports 30, 32 may also be designed to be larger or smaller than transducer acoustic ports 25, 26 in order to control the radiation pattern of the individual transducers. The acoustic waveguides may be designed to be of length ¼λ*(2n−1) where and n=1, 2, 3 . . . in order to form an acoustic resonance. The lengths of the acoustic waveguides 34, 50 can be adjusted by an amount C to account for the end effects produced by ports 30, 32. It should be understood that the spacing of the acoustic ports 30, 32 may be non-uniform in order to realize a desired acoustic transmission or reception beam profile. The acoustic waveguides 34, 50 may be designed to couple uniformly spaced transducers 22, 24 to non-uniformly spaced acoustic ports 30, 32.

Figure 3:
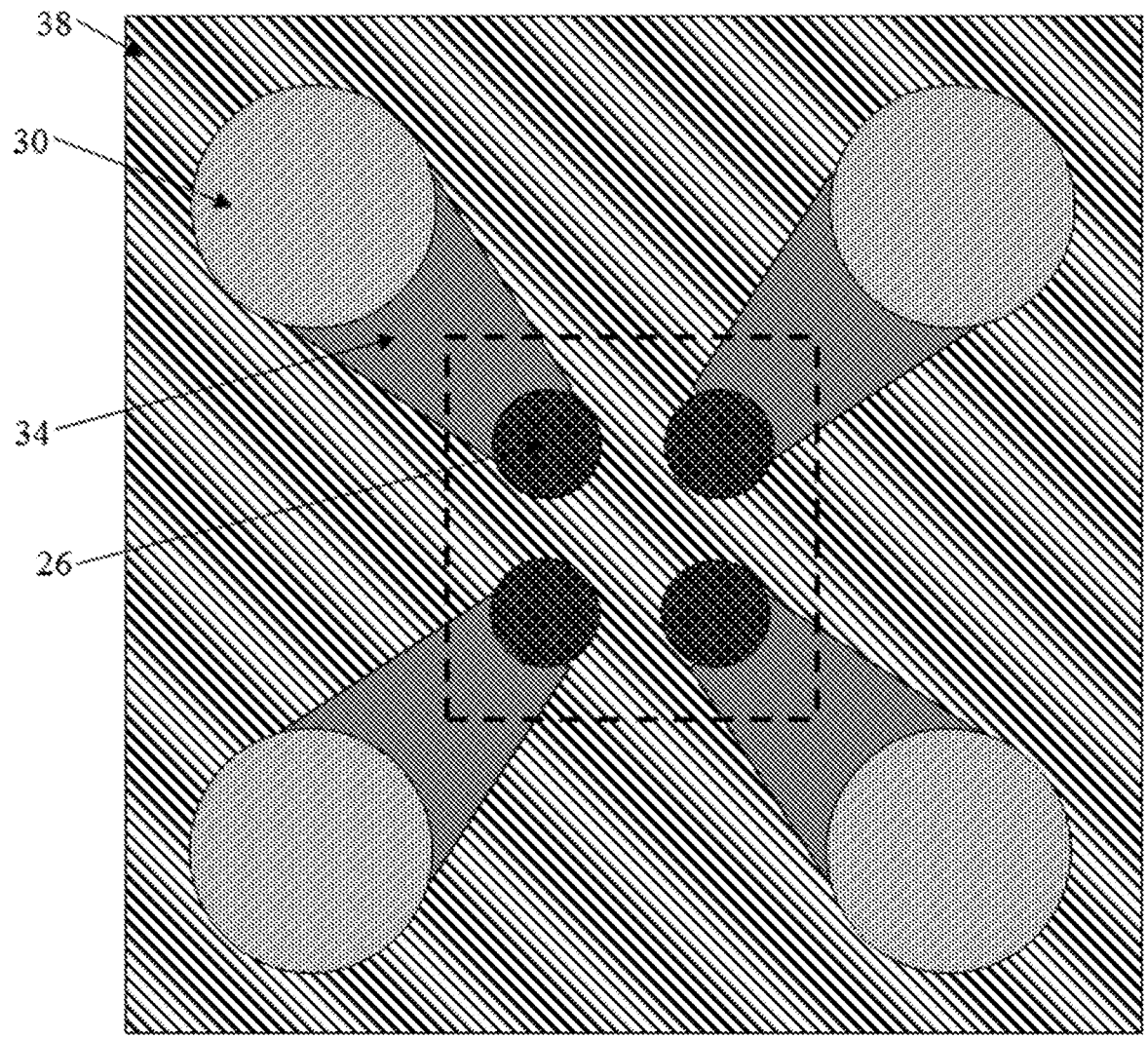
FIG. 3 shows a schematic top view of an acoustic transducer package.

FIG. 3 shows a top view of a chip package 40. Chip package surface layer 38 contains several acoustic ports 30 which are connected to transducer acoustic ports 26 through acoustic waveguides 34 which are between the array-mounting layer 36 and the chip package surface layer 38. In this view it is appreciated that the separation (i.e., spacing) and diameter of acoustic ports 30 is much larger than the separation and diameter of transducer acoustic ports 26.

Figure 4:
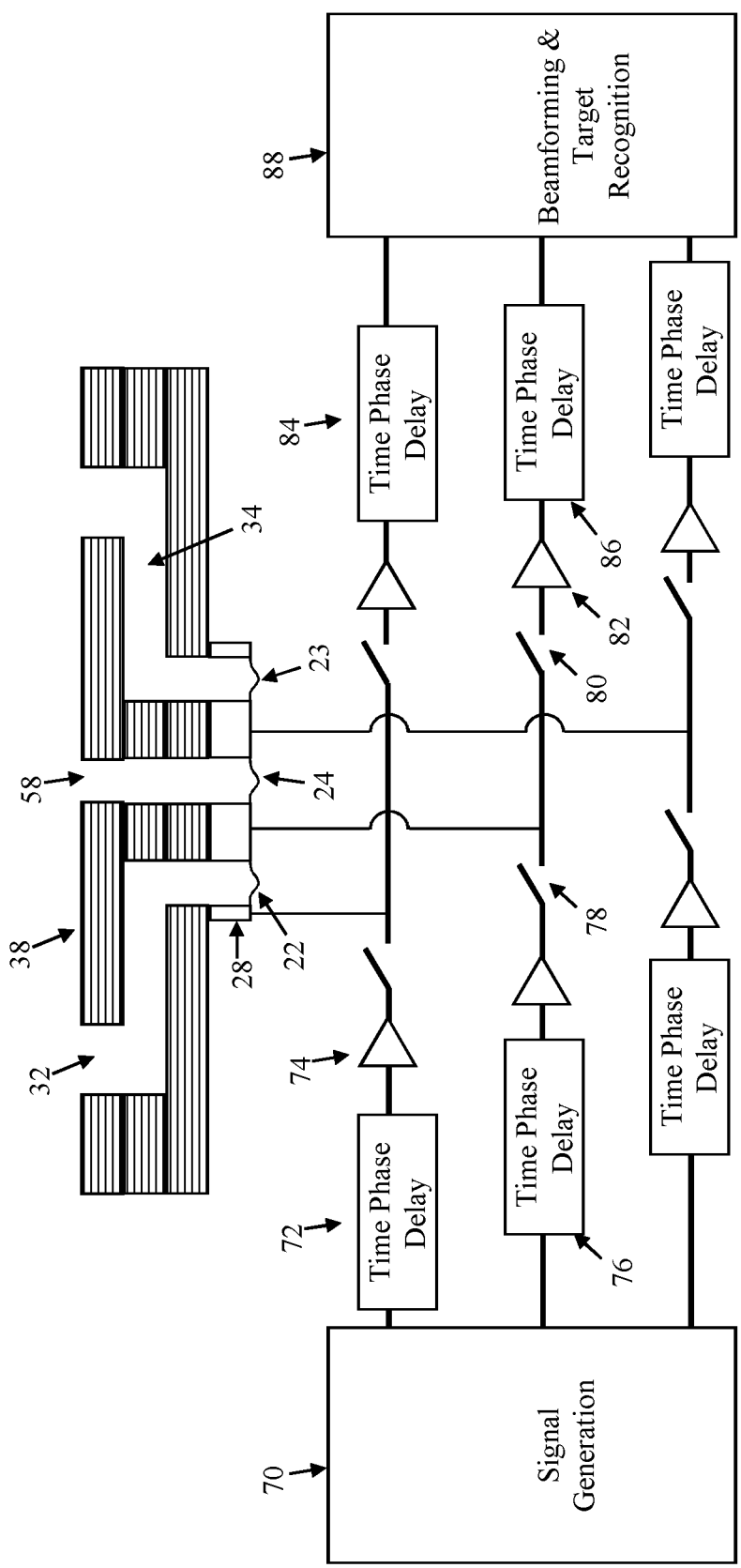
FIG. 4 shows a block diagram of an electrical subsystem.

FIG. 4 shows a block diagram of an electrical subsystem which may be incorporated in whole or in part in integrated circuit 44 of FIG. 2. The electrical subsystem sends and receives signals from an acoustic transducer array 28. In this example system, package acoustic waveguide 58 is shorter than acoustic waveguide 32 or acoustic waveguide 34. This system is provided as way of example, and the methods described herein may be extended to cover arrays with different geometries or designs.

By way of example, acoustic waveguides 34, 50 may be designed to resonate with a length of 5λ/4 while acoustic waveguide 58 may be designed to resonate with a length of 3λ/4. In this case, the acoustic delay of acoustic waveguide 58 is $3/(4\ f_o)$ and the delays of waveguides 34, 50 are $5/(4\ f_o)$, where $f_o$ is the operational frequency.

Consider the case where the transducer array 28 is transmitting a beam of sound with a steering angle normal to the array. In this case, the sound signals generated by the transducers 22, 24 and transmitted through acoustic waveguides 32, 58, and 34 must be emitted in phase such that the emitted waves interfere constructively on-axis in the farfield of the array. In this example, since the acoustic delay of waveguide 58 is $1/(2\ f_o)$ shorter than that of waveguides 32, 34, the electrical signals that excite transducer 24 must be delayed by $1/(2\ f_o)$. This is accomplished by delaying the signal from signal generation block 70 in a time/phase delay block 76. The time/phase delay block 76 may be implemented by shifting the phase of the signal, especially in the case where the phase coherence length of the signal is many periods long compared to the desired phase delay. The time/phase delay block 76 could instead be implemented with a time delay block, especially in the case where the phase coherence length of the signal is short compared to the desired delay. It is appreciated that in some embodiments, focusing of the beam may be desired. In these cases, the emitted waveforms may be designed to be in phase at the focal depth of the waveform. In this case, the time/phase delay block 76 may implement an additional time/phase delay in order to achieve the desired focusing condition.

After the phase or time delay of each channel's signal is adjusted, each signal passes through separate amplifiers 74 and separate transmit switches 78. During this phase, if receive circuits are present, receive switches 80 are open to prevent the transmit signals from damaging the receive circuits. Many other embodiments are possible, including one where the transmit amplifiers 74 and receive amplifiers 82 are connected to separate electrodes on each transducer, and an alternate switching configuration is used.

Now consider the case where the array is transmitting at an angle from normal. The desired time delays between the signals emitted at waveguide ports 58 and 34 relative to the signal emitted at waveguide port 32 are $1/(4 f_o)$ and $1/(2 f_o)$, respectively. After compensating for the waveguide delay mismatch, the final delays implemented by the time/phase delay blocks should be $3/(4 f_o)$ and $1/(2 f_o)$, respectively.

It is understood that this embodiment constitutes one way to implement the required delays or phase shifts. Other embodiments such as those that omit time/phase delay blocks 76 and use signal generation block 70 to generate the correct signals could achieve the same functionality and are intended to be within the scope of this disclosure. By way of further example, consider the case when transducer array 28 is receiving an acoustic signal returning at arbitrary angle. As in the transmit case, the acoustic delay of waveguide 58 is $1/(2 f_o)$ shorter than that of waveguides 32, 34, so the electrical signals that excite transducer 24 must be delayed by $1/(2 f_o)$. In one embodiment, receive switches 80 pass the signal to receive processing block 82 and then to time/phase delay blocks 84, 86. Receive processing blocks 82 may include amplifiers, filters, and/or analog-to-digital converters, so the processing of the received signals may be implemented in the analog or digital domain. Time/phase delay block 86 shifts or delays the signal from transducer 24 by $1/(2 f_o)$ before the signals pass into beamforming and target recognition block 88. Beamforming and target recognition block 88 may be a hardware or software block. If it is a hardware block, it may work in the analog or digital domain. This block may extract features from the received signals or perform spatial filtering of the received signal. Details of an example of a beamforming and target recognition block are described, e.g., in R. Przybyla, H.-Y. Tang, S. Shelton, A. Guedes, D. Horsley, and B. Boser, "Ultrasonic 3D Rangefinder on a Chip," Journal of Solid State Circuits, vol. 50, no. 1, pp. 320-334, January 2015, the entire contents of which are incorporated herein by reference.

By way of example, when the spacing of the several acoustic ports is non-uniform, the transducer array 28 may be controlled such that a subset or the full set of transducers is used to transmit sound which is emitted from the corresponding acoustic ports having a first acoustic beam profile. The transmitted beam profile may have undesirable properties such as grating lobes. During reception the transducers may be controlled such that a different subset or full set of transducers is used to receive sound signals which are processed in beamforming and target recognition block 88. Examples of ways of controlling a transducer array to deal with grating lobes are described by Lockwood, G. R.; Pai-Chi Li; O'Donnell, M.; Foster, F. S., "Optimizing the radiation pattern of sparse periodic linear arrays," in Ultrasonics, Ferroelectrics, and Frequency Control, IEEE Transactions on, vol. 43, no. 1, pp. 7-14, January 1996, the entire contents of which are incorporated herein by reference.

Although the description herein contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. For example, while circular embodiments are shown, the acoustic array elements may have many different shapes such as square, rectangular, hexagonal, octagonal, and so on. All such variations that would be apparent to one of ordinary skill in the art are intended to fall within the scope of this disclosure. It will also be appreciated that the drawings are not necessarily to scale, with emphasis being instead on the distinguishing features of the PMUT device disclosed herein.

All cited references are incorporated herein by reference in their entirety. In addition to any other claims, the applicant(s)/inventor(s) claim each and every embodiment of the invention described herein, as well as any aspect, component, or element of any embodiment described herein, and any combination of aspects, components or elements of any embodiment described herein.

The invention claimed is:

1. An acoustic transducer package, comprising:
an acoustic transducer array having a plurality of acoustic transducers formed on a substrate;
a chip package attached to the acoustic transducer array, wherein the chip package includes a plurality of acoustic waveguides coupled to a plurality of acoustic ports, wherein each acoustic waveguide in the plurality of acoustic waveguides is coupled between a corresponding acoustic transducer in the plurality of acoustic transducers and a corresponding acoustic port in the plurality of acoustic ports, wherein a spacing of a pair of acoustic ports in the plurality of acoustic ports is different than a spacing of a corresponding pair of acoustic transducers in the plurality of acoustic transducers.

2. The acoustic transducer package of claim 1, wherein the spacing of the pair of acoustic ports in the plurality of acoustic ports is larger than the spacing of the corresponding pair of acoustic transducers in the plurality of acoustic transducers.

3. The acoustic transducer package of claim 1, wherein the spacing of the pair of acoustic ports in the plurality of acoustic ports is smaller than the spacing of the corresponding pair of acoustic transducers in the plurality of acoustic transducers.

4. The acoustic transducer package of claim 1, wherein the acoustic ports in the plurality of acoustic ports are spaced with a pitch that is less than $5\lambda$, where $\lambda$ is an acoustic wavelength.

5. The acoustic transducer package of claim 1, wherein the spacing between acoustic ports in the plurality of acoustic ports is non-uniform.

6. The acoustic transducer package of claim 4, wherein the pitch is between $\frac{1}{2}\lambda$ and $\lambda$.

7. The acoustic transducer package of claim 1, wherein one or more acoustic waveguides in the plurality of acoustic waveguides are characterized by a length of $\frac{1}{4}\lambda*(2n-1)+C$ where $\lambda$ is an acoustic wavelength, n=is a positive integer and C is a correction term that accounts for end effects produced by the acoustic ports.

8. The acoustic transducer package of claim 1, further comprising an integrated circuit coupled to the acoustic transducer array.

9. The acoustic transducer package of claim 8, wherein the integrated circuit is attached to the chip package.

10. The acoustic transducer package of claim 8, wherein the integrated circuit includes a signal generation unit configured to generate a plurality of driving signals, wherein each driving signal of the plurality of driving signals drives a corresponding transducer of the plurality of transducers.

11. The acoustic transducer package of claim 10, further comprising a plurality of signal amplifiers coupled between the signal generation unit and the acoustic transducer array, wherein each signal amplifier of the plurality of signal amplifiers amplifies a corresponding driving signal of the plurality of driving signals.

12. The acoustic transducer package of claim 10, further comprising a plurality of delay elements coupled between the signal generation unit and the acoustic transducer array, wherein each delay element of the plurality of delay elements applies a delay to a corresponding driving signal of the plurality of driving signals.

13. The acoustic transducer package of claim 8, wherein the integrated circuit includes a beamforming and target recognition block coupled to the acoustic transducer array.

14. The acoustic transducer package of claim 13, wherein the beamforming and target recognition block is configured to extract features signals received from the acoustic transducer array.

15. The acoustic transducer package of claim 13, wherein the beamforming and target recognition block is configured to perform spatial filtering of signals received from the acoustic transducer array.

16. The acoustic transducer package of claim 13, further comprising a plurality of signal amplifiers coupled between the beamforming and target recognition block and the acoustic transducer array, wherein each signal amplifier of the plurality of signal amplifiers amplifies a corresponding received signal from a corresponding acoustic transducer of the plurality of acoustic transducers.

17. The acoustic transducer package of claim 13, further comprising a plurality of delay elements coupled between beamforming and target recognition block and the acoustic transducer array, wherein each delay element of the plurality of delay elements applies a delay to a corresponding received signal from a corresponding acoustic transducer of the plurality of acoustic transducers.

18. A method, comprising:
generating a plurality of acoustic signals with an acoustic transducer array having a plurality of acoustic transducers formed on a substrate;
transmitting each acoustic signal in the plurality of acoustic signals through a corresponding acoustic waveguide of a plurality of acoustic waveguides coupled to a plurality of acoustic ports, wherein each acoustic waveguide in the plurality of acoustic waveguides is coupled between a corresponding acoustic transducer in the plurality of acoustic transducers and a corresponding acoustic port in the plurality of acoustic ports, wherein a spacing of a pair of acoustic ports in the plurality of acoustic ports is different than a spacing of a corresponding pair of acoustic transducers in the plurality of acoustic transducers, wherein one or more acoustic waveguides in the plurality of acoustic waveguides are characterized by a length of $\frac{1}{4}\lambda*(2n-1)+C$ where $\lambda$ is an acoustic wavelength, n=is a positive integer and C is a correction term that accounts for end effects produced by the acoustic ports.

19. The method of claim 18, wherein generating the plurality of acoustic signals includes generating a plurality of driving signals that drive the one or more acoustic transducers, wherein each driving signal of the plurality of driving signals drives a corresponding transducer of the plurality of transducers.

20. The method of claim 19, further comprising amplifying the plurality of driving signals with a plurality of signal amplifiers coupled between the signal generation unit and the acoustic transducer array, wherein each signal amplifier of the plurality of signal amplifiers amplifies a corresponding driving signal of the plurality of driving signals.

21. The method of claim 19, further comprising delaying the plurality of driving signals with a plurality of delay elements coupled to the acoustic transducer array, wherein each delay element of the plurality of delay elements applies a delay to a corresponding driving signal of the plurality of driving signals.

22. A method, comprising:
receiving one or more acoustic signals at a plurality of acoustic ports;
transmitting the one or more acoustic signals through a plurality of acoustic waveguides to a plurality of acoustic transducers formed on a substrate, wherein each acoustic waveguide in the plurality of acoustic waveguides is coupled between a corresponding acoustic transducer in the plurality of acoustic transducers and a corresponding acoustic port in the plurality of acoustic ports,
wherein a spacing of a pair of acoustic ports in the plurality of acoustic ports is different than a spacing of a corresponding pair of acoustic transducers in the plurality of acoustic transducers; and
generating a plurality of received signals with the plurality of acoustic transducers from the one or more acoustic signals.

23. The method of claim 22, further comprising extracting features from the plurality of received signals generated with the acoustic transducer array.

24. The method of claim 22, further comprising performing spatial filtering on the plurality of received signals generated with the acoustic transducer array.

25. The method of claim 22, further comprising amplifying the plurality of received signals with a plurality of signal amplifiers coupled to the acoustic transducer array, wherein each signal amplifier of the plurality of signal amplifiers amplifies a corresponding received signal from a corresponding acoustic transducer of the plurality of acoustic transducers.

26. The method of claim 22, further comprising delaying the plurality of received signals with a plurality of delay elements coupled to the acoustic transducer array, wherein each delay element of the plurality of delay elements applies a delay to a corresponding received signal from a corresponding acoustic transducer of the plurality of acoustic transducers.

* * * * *